Feb. 14, 1961     C. B. PUTNEY     2,972,132
CONTROL SYSTEM
Filed Sept. 10, 1957
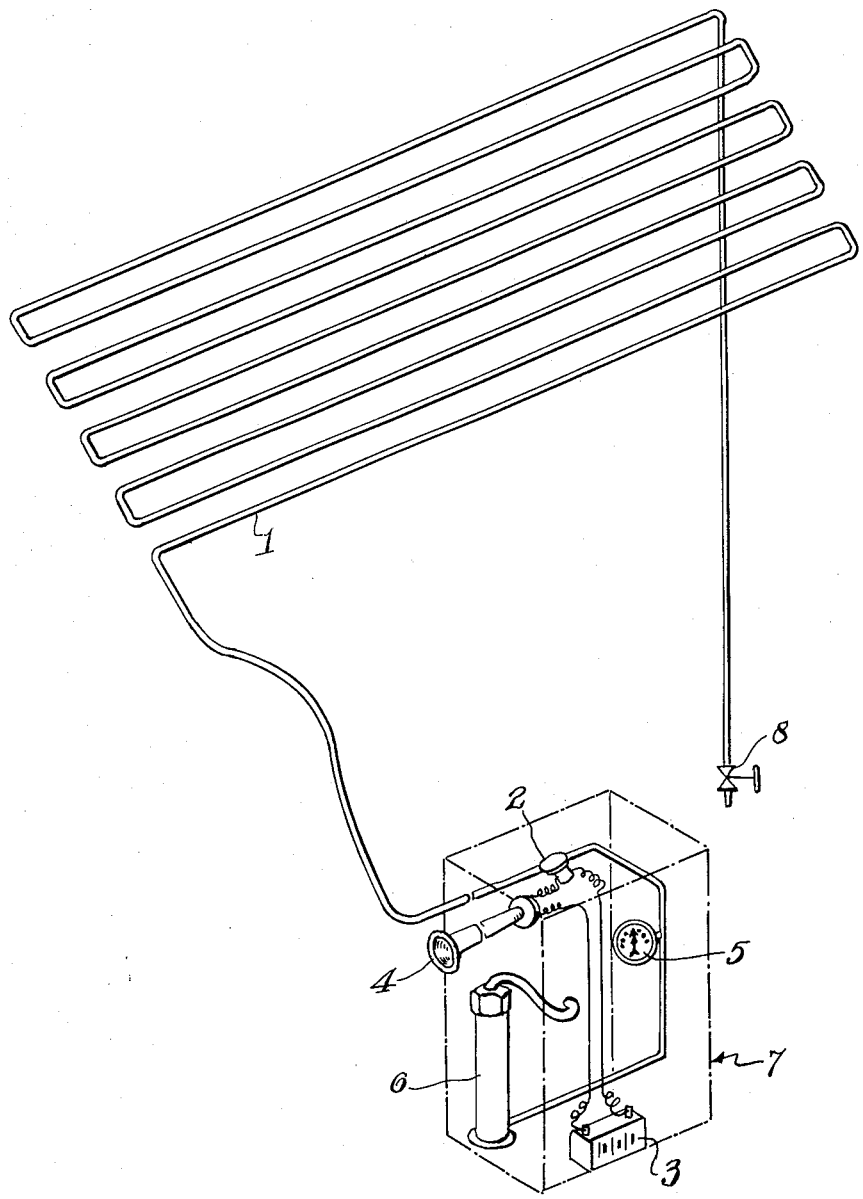
Inventor:
Charles B. Putney
By C. H. Mortenson
Attorney.

United States Patent Office 2,972,132
Patented Feb. 14, 1961

2,972,132
CONTROL SYSTEM
Charles B. Putney, Briarwood, Del.
(264 S. 3rd Ave., Ilion, N.Y.)
Filed Sept. 10, 1957, Ser. No. 683,043
11 Claims. (Cl. 340—229)

This invention relates to improved detection systems. More particularly, it relates to a fire alarm signal combination which may be adapted to be unresponsive to normal conditions of heat but responsive to an amount of heat desired to be avoided.

There has been described certain fire detection apparatus that is responsive to an increase of pressure in a confined gas which increase is caused by a change of temperature. The pressure increase acts upon a pressure responsive element which in turn activates an alarm. Even with the installation of these devices there are many disastrous fires, the devices having failed because of insensitivity, clogging or through uncorrected or undetected loss of gas through leaks prior to the fire, among other reasons. Frequently fires break out in places which are inaccessible and in which devices heretofore available have been difficult to place. Accordingly, there is a need for a detecting unit which is inexpensive, which can be installed by the property owner and which is efficient.

An object of this invention is to provide a detection system which operates simply and which can be readily installed. Another object is the provision of a fire alarm apparatus which is inexpensive and which can be fixed to become activated at a temperature which the property owner desires to detect. Other objectives will appear hereinafter.

The objectives of this invention are accomplished by a detecting system which comprises a continuous thermoplastic tube which is strung in the area being supervised and which is filled with a gas under pressure and which is connected to a pressure switch responsive to a decrease in pressure. The tubing is made up of a polymeric material such as polyethylene. Such tubing is commercially available in continuous lengths. Therefore, the tubing is generally strung extensively throughout the area to be protected. If the temperature should rise in a given area to a value near the melting or softening point of the plastic, the tube becomes heated and it very quickly ruptures. The plastic flow of the polymer is hastened by the increased pressure within the tube. Upon rupture of the tube, the gas contained in the tube is released and the pressure switch activates a sound alarm or a light or both.

This invention will be further understood by reference to the description and the single figure which are given for illustrative purposes only and are not limitative.

The figure is a diagrammatical view of an alarm system of this invention.

Referring to the figure, the tubing 1 is a flexible, thermoplastic tubing made from a polymeric material which is chosen for its properties. That is, depending upon where the system of this invention is going to be placed, one will choose a low melting or low softening polymer like polyethylene or one will choose a high melting or softening polymer such as polytetrafluoroethylene. The polymers that can be used are selected from the large number of plastic materials that are commercially available. Included among these are polyethylene, polyvinyl chloride, polyvinylidene chloride, polyamides such as polyhexamethylene adipamide, polytetrafluoroethylene, polymonochlorotrifluoroethylene and polymerized epsiloncaprolactam. The thermoplastic materials also include vinyl or related resins such as polymers of vinyl acetate, vinyl chloride, vinylidene chloride and other polymerizable vinyl resins such as acrylonitrile, styrene and the like. The polyamides that may be used may include also the polyamide-esters. Cellulosic thermoplastics may be used such as the cellulose esters or ethers which include ethyl cellulose, cellulose acetate, cellulose propionate, cellulose butyrate, benzyl cellulose and combinations thereof.

The thermoplastic tubing can be modified chemically. For example, sometimes it is desired to cross-link a polymeric material to improve certain of its properties. The plastics may also be physically modified by incorporation of the plastics with such materials as fillers, dyes, pigments and plasticizers. The various materials which may be incorporated include fibrous materials such as glass or synthetic fibers, carbon black, pigments such as zinc oxide or titanium oxide and plasticizers such as dibutyl sebacate, tricresyl phosphate and dibutyl phthalate. Thus, modifications can be made to improve or change the mechanical or chemical properties as desired. Generally, however, there is little problem in selecting a suitable plastic material. Knowing the conditions normally prevailing in the area to be protected and knowing the condition to be avoided, such as an elevation of temperature to an excessive degree, the person installing the device of this invention will select a thermoplastic material that has a softening point as close as possible to the temperature considered to be hazardous and to be detected. Usually there is no difficulty in selecting such a material, because a wide variety of thermoplastic materials is on the market. However, if one does have difficulty or if one desires to bring the rupture point of the tube closer to the temperature to be detected, he can readily incorporate in the chosen thermoplastic material a material that softens the tubing, such as a plasticizer, or a material which increases its strength such as a fibrous material. Further, the installer can vary the wall thickness or the pressure within the tubing, among other factors. Thus, the installer can calibrate the device of this instrument and adjust it to the detecting point desired.

Normally, one will desire to have a short term failure under the conditions requiring warning. As stated, to some extent the length of time for the failure to occur can be regulated by the thickness of the tube wall, the pressure of the gas within the tube and similar factors. For example, if it is desired to detect temperatures to 150° F. to 170° F., typical commercially available polyethylene tubing having a ¼" outer diameter and a 0.040" wall thickness gives excellent results when the gas pressure within the tube is 40 to 60 pounds per square inch gauge. Such tubing fails in very short time when the temperature reaches 150° F. to 170° F.

As will be noted, this tubing is connected to a pressure switch 2. When the temperature of the tube rises and the tube ruptures, as described above, the pressure switch trips, and current passes from the battery 3, usually a six-volt battery, to the horn 4. The horn, of course, sound a warning. The pressure switch may be normally closed with the pressure being off or below a certain value. The pressure switch may also be a single pole, double throw switch so that the system is supervised having a means to show that the system is working satisfactorily. For example, in the normal position, that is, pressure on, the switch, through one of the throw positions, feeds current to a light or some similar indicating device or such other means to show that the circumstances in the surroundings are normal. With the pressure off, the pole is thrown to the other position, and the switch feeds current to the alarm device, such as a horn. The means indicating normal goes off; the warning means is activated. In this way, a supervised system is easily available.

Usually connected in the system is the pressure gauge 5 and a pump 6. The pump, battery, gauge, switch and horn are generally encased in a portable box 7 and located outside the structure that is being protected. In farm use for protecting barns the box 7 is generally placed somewhere near the farm residence. The location, of course, can be varied to suit the owner and it is generally placed somewhere near an area of continuous activity. If desired, a multiplicity of alarm devices may be used, for example, two horns may be sounded, one being placed near the farm residence and the other being placed in the milkhouse.

It should be noted that one end of the plastic tubing is connected to the hand pump while the other end is in the area being supervised. The latter end may be simply sealed, but generally it is desired to attach it to the test valve 8. With the test valve 8 attached, the owner may open the valve thus simulating a rupture in the tubing and sounding the alarm if the various parts are in proper working order. If the alarm does not sound, the owner will, of course, make the necessary repairs or replacement. Further, this simple test will allow the operator to check the continuity of the tubing in the system, for any obstruction, such as a kink, for example, would prevent the alarm from sounding.

The gas that is used to fill the tube is normally air supplied by the use of a pump as shown. However, other gases may be used, such as carbon dioxide, nitrogen, and sulfur dioxide. Sometimes it is of an advantage to include in the gas or use as the gas a material which has a noticeable odor. Thus, sulfur dioxide or hydrogen sulfide can be used for giving an extra warning to the people as well as helping in locating leaks should any occur. Such gaseous materials can be supplied from the usual pressure containers that are available commercially.

Generally, it is not necessary to coat or treat the various plastic tubings to make them impermeable to air or other gas being used. That can be done, however, but usually one is able to select the polymer having the desired impermeability and failure properties without much difficulty. As a matter of practicality, the thermoplastic tubing used in the device of this invention does not have to be absolutely sealed against the entrance into the tube of vapors such as water vapor, air and the like or the departure within the tube of such vapors. Since the tubing is thermoplastic, very tight joints are easily made by the application of heat at the joint. Any serious loss of pressure from within the tube will cause the alarm to be sounded. Generally, the pressure gauge in the box is fixed so that the gauge is in the outer wall of the box or is in plain view so that periodical checks on the pressure can be readily made at a glance.

If desired the alarm device can be a light signal by itself or in conjunction with a horn. Also, the tubing may be connected to a pressure sensitive valve which upon rupture of the tubing opens and closes an extinguisher to emit a fire extinguishing material such as carbon dioxide or sound an alarm or both or the switch may be adapted to open a sprinkling system.

If the property that one wishes to protect is normally operated in an elevated temperature, one will select a material such as polytetrafluoroethylene which has the high softening point of 327° C. Thus, the device of this invention can be used to detect dangerous conditions around running motors such as in airplanes or in other motor-driven objects such as automobiles, boats, turbines and the like. The device may also be used in industrial areas of all kinds. As well as sounding an alarm, the device may be equipped to activate a means for shutting down any equipment that is running.

It should be noted that the thermoplastic tubing used in the devices of this invention is continuous tubing. A number of advantages attend the use of such tubing. For example, the tubing can be tested for leaks prior to installation and pressures in excess of what are actually going to be needed can be applied to make sure that the tubing contains no flaws which would cause trouble after installation at normal pressure conditions or the pressure extant under hazardous conditions. Also, there are no joints to be made except at the very accessible places in the box at the pressure switch and at the pressure gauge and at the hand pump. The other end of the tubing is placed in an accessible place and is either sealed tight to itself by application of heat or a test valve is inserted in that end as described. The fact that the tubing is available in continuous lengths allows one to install the tubing at many places within a given area without much trouble. For example, the tubing can be strung across a wall or a ceiling quite a number of times very rapidly, holding the tubing to the wall or ceiling by staples, hand or machine driven into the wall or ceiling. Every part of the tubing is a detecting part. In other words, the device of this invention affords a very large area of exposure for detection and thus affords a very large area of protection.

Further, the system is inexpensive. High cost installation is avoided. The tubing is very flexible and can be handled very readily. Thus, the installer can place this tubing in inaccessible places; for example, it can be easily positioned between walls. The tubing can also be given a pleasant appearance by the incorporation of color materials, for example. Installation in occupied areas such as homes and stores can be effected without detracting from the physical surroundings.

It should also be noted that the device of this invention can be used other than as a fire detecting system. It can be used, for example, as a burglar alarm. The installer need only to position it near a window or door to be controlled so that upon opening of the window or door the tube is punctured. In these modifications the puncturing device is usually a sharp-pointed prong positioned on the window or door being opened.

While the invention has been disclosed herein in connection with certain embodiments and certain procedural details, it is clear that changes, modifications or equivalents can be used by those skilled in the art; accordingly, such changes within the principles of this invention are intended to be included within the scope of the claims below:

I claim:

1. An alarm system comprising a thermoplastic tubing; sealed at both ends and having at one end of said tubing a pressure responsive element being an electrical switch; contained in said tubing a gas under pressure; and activated by said pressure an alarm, said alarm being activated by said switch upon a decrease in the pressure of said gas, said thermoplastic tubing being composed of a polymeric material and being quickly ruptured at its softening point under said pressure conditions.

2. An alarm system comprising a continuous thermoplastic tubing; sealed at both ends and having at one end a pressure responsive electrical switch; contained in said tubing a gas under pressure; and an alarm being activated by said pressure responsive switch, said switch in turn being activated by a decrease in the pressure of the said gas, said thermoplastic tubing being composed of a polymeric material and being quickly ruptured at its softening point under said pressure conditions.

3. A system for detecting fire and high temperatures which comprises a continuous thermoplastic tubing sealed at one end; connected to the other end a pressure responsive electrical switch; connected to and activated by the said switch a means for giving an alarm; and contained in the said tubing a gas under pressure, said thermoplastic tubing being composed of a polymeric material and being quickly ruptured at its softening point under said pressure conditions.

4. A system in accordance with claim 3 which includes means for measuring the pressure of the said gas within the said tubing.

5. A system in accordance with claim 3 which includes a means for inserting the said gas into the said tubing under pressure.

6. A system in accordance with claim 3 which includes a test valve.

7. A system in accordance with claim 3 in which said switch and said alarm means are housed in a portable container.

8. An alarm system for detecting a given temperature comprising a continuous, flexible thermoplastic tubing sealed at both ends and contained therein a gas under pressure, the thickness of said tubing and the pressure of said gas being calibrated to said temperature to be detected, the said thermoplastic tubing being composed of a polymeric material and being quickly ruptured at its softening point under said temperature and pressure conditions; sealed to said tubing to form a closed system a pressure responsive electrical switch, said switch being responsive to a decrease in said pressure; and an alarm activated by said electrical switch.

9. A system in accordance with claim 8 in which the tubing has an outer diameter of about ¼ inch and a wall thickness of about 0.040 inch.

10. A system in accordance with claim 9 in which said tubing is a polyethylene tubing.

11. An alarm system comprising a thermoplastic tubing composed of a polymeric material, sealed at both ends and containing a gas under pressure, said tubing being quickly ruptured at its softening point under said pressure conditions; a pressure responsive element sealed at one end of said tubing, said element being an electrical switch normally open when the said gas is under said pressure and closed when said pressure is released; and an alarm activated by said switch upon closing thereof.

References Cited in the file of this patent

UNITED STATES PATENTS

| | | |
|---|---|---|
| 788,199 | Fiddes et al. | Apr. 25, 1905 |
| 1,219,723 | Gracey et al. | Mar. 20, 1917 |
| 1,753,361 | Cawthon | Apr. 8, 1930 |
| 1,779,463 | Conner | Oct. 28, 1930 |
| 2,403,938 | Macan | July 16, 1946 |
| 2,549,645 | Tendall | Apr. 17, 1951 |